United States Patent
Chiang

(10) Patent No.: US 7,167,995 B2
(45) Date of Patent: *Jan. 23, 2007

(54) ROBUST AND SCALABLE DE-SKEW METHOD

(75) Inventor: John Ming Yung Chiang, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/231,773

(22) Filed: Sep. 22, 2005

(65) Prior Publication Data

US 2006/0026449 A1 Feb. 2, 2006

Related U.S. Application Data

(63) Continuation of application No. 10/121,712, filed on Apr. 15, 2002, now Pat. No. 6,996,738.

(51) Int. Cl.
- G06F 11/00 (2006.01)
- H04J 3/06 (2006.01)
- H04L 7/00 (2006.01)

(52) U.S. Cl. .................. 713/503; 370/503; 375/368
(58) Field of Classification Search .......... 713/503; 370/516, 508, 503; 375/371, 365, 368

See application file for complete search history.

(56) References Cited

U.S. PATENT DOCUMENTS

| | | | |
|---|---|---|---|
| 5,278,789 A | 1/1994 | Inoue et al. | |
| 5,555,398 A | 9/1996 | Raman | |
| 5,652,579 A | 7/1997 | Yamada et al. | |
| 5,742,613 A | 4/1998 | MacDonald | |
| 6,031,847 A | 2/2000 | Collins et al. | |
| 6,061,351 A | 5/2000 | Erimli et al. | |
| 6,175,902 B1 | 1/2001 | Runaldue et al. | |
| 6,735,397 B1 | 5/2004 | Herrity | |
| 2002/0009169 A1 | 1/2002 | Watanabe | |
| 2002/0126704 A1 | 9/2002 | Cam et al. | |
| 2003/0095575 A1 | 5/2003 | Annadurai et al. | |

FOREIGN PATENT DOCUMENTS

| | | |
|---|---|---|
| EP | 659001 | 6/1995 |
| JP | 4-189023 | 7/1992 |

OTHER PUBLICATIONS

"POS-PHY™ Level 4, A Saturn Packet and Cell Interface Specification for OC192 Sonet/SDH and 10 Gigabit Ethernet," PMC-Sierra, Inc., Interface Specification, No. 6, Feb. 2001, p. 1-49.

Primary Examiner—Chun Cao
Assistant Examiner—Suresh K Suryawanshi
(74) Attorney, Agent, or Firm—Squire, Sanders & Dempsey, LLP.

(57) ABSTRACT

A method for selectively deskewing data traveling through a bus in a network device is disclosed. Bit-level data is received from each data line of a plurality of data lines of the bus. Vertical line information is detected for the plurality of data lines to determine if there is a match with a training pattern. A skew distance is calculated once there is a match with the training pattern. Then, the plurality of data lines are bit aligned based on the skew distance.

21 Claims, 10 Drawing Sheets

ROBUST AND SCALABLE DE-SKEW METHOD

REFERENCE TO RELATED APPLICATION

This is a Continuation of application Ser. No. 10/121,712, filed Apr. 15, 2002 now U.S. Pat. No. 6,996,738. The disclosure of the prior application is hereby incorporated by reference in its entirety.

BACKGROUND OF THE INVENTION

1. Field of the Invention

The present invention relates to a method and apparatus for selectively correcting the skewing of data lines between network devices. More specifically, a technique is applied to deskew the bit lines of a wide bus to guarantee the alignment of the lines with respect to a system clock.

2. Description of Related Art

A bus, as used in a network device, is a set of parallel conductors, which allow devices attached to it to communicate with each other. A bus usually consists of various lines, some of which allow for the flow of data and other lines that allow for control. As network devices have been operated at higher frequencies, problems can occur with the buses that were not evident in the buses at lower frequencies. One problem that occurs is the skewing of data in the bus; i.e. where different data lines in the bus have different alignments with respect to each other and a system clock.

There are several possible ways to introduce skew: PC board traces, temperature, different processes and data recovery circuitry. The longest distance of skew could well over +/−1 bit, but not likely to have skew greater than +/−2 bits. For buses operating at lower frequencies, such problems of skew were easier to solve because the lower frequency allowed for more "time" for correction. Additionally, the advent of wider buses can allow for even greater skewing between data in a first data line and a sixteenth data line, for example.

Thus, there is a need for a method and a mechanism in a network device that allows for data lines to be deskewed, especially for wide buses operating a high frequencies. Additionally, there is also a need for a process of deskewing data which can be either automatic or manually controlled and alos allow for monitoring of the skewing of data in the bus.

SUMMARY OF THE INVENTION

It is an object of this invention to overcome the drawbacks of the above-described conventional network devices and methods. A deskew method is discussed that is versatile and applicable to many bus structures. The method can deskew up to a 5-bit distance and can deskew using only a single training pattern.

According to one aspect of this invention, a method for selectively deskewing data traveling through a bus in a network device is disclosed. Bit-level data is received from each data line of a plurality of data lines of the bus. Vertical line information is detected for the plurality of data lines to determine if there is a match with a training pattern. A skew distance is calculated once there is a match with the training pattern. Then, the plurality of data lines are bit aligned based on the skew distance.

Alternatively, the method is capable of deskewing data having a skew distance up to a 5-bit distance and is applicable to data sent via a system packet interface level 4 interface. In addition, a manual skew register may be checked to determine if a manual deskew process should be performed. If the register so indicates, the bit aligning of the plurality of data lines occurs according to a manual skew distance entered by a user. A freeze current deskew pattern register can also be monitored to determine if the current deskew pattern should be maintained. In the latter case, the step of calculating a skew distance is skipped and the skew distance is set based the current skew pattern.

In another embodiment, an apparatus for selectively deskewing data traveling through a bus in a network device is also disclosed. The apparatus has means for receiving bit-level data from each data line of a plurality of data lines of the bus and means for detecting vertical line information for the plurality of data lines to determine if there is a match with a training pattern. Also, it has means for calculating a skew distance once there is said match with the training pattern and means for bit aligning the plurality of data lines based on the skew distance.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

As discussed above, the deskew methods of the present invention can be applied to any bus in a network device. The method and apparatus used to carry out the method are discussed below with respect to an illustrative bus architecture. That architecture is the System Packet Interface Level 4 (SPI-4) architecture. While this example will be discussed at length, it should be understood that the methods of the present invention are applicable to many types of bus architectures.

SPI-4 is an interface for packet and cell transfer between a physical layer (PHY) device and a link layer device, for aggregate bandwidths of OC-192 ATM and Packet over SONET/SDH (POS), as well as 10 Gb/s Ethernet applications. A general overview of the interface is provided, along with more detailed descriptions of the signals and associated operations, data structures, start-up and AC timing parameters.

Figure 1:
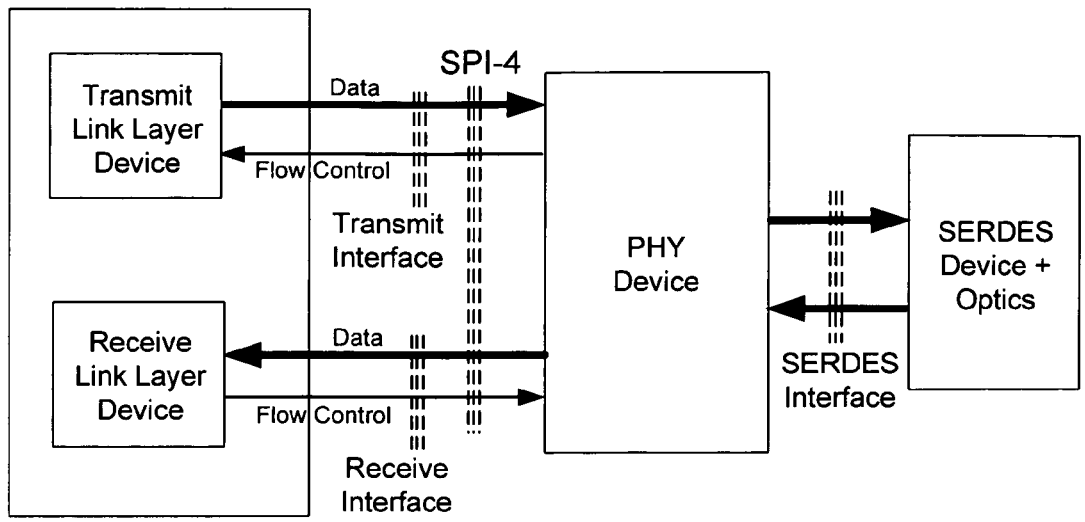
FIG. 1 illustrates a system reference model for a system packet interface to which the methods of the present invention is applied in a specific embodiment.

The following is a general synopsis of the SPI-4 interface. For reference, a general block diagram is shown in FIG. 1. SPI-4 is the system packet interface for data transfer between the link layer and the PHY device; it is designed to meet requirements of this particular application, although it may be used in other applications as well. "Transmit" and "Receive" refer, respectively, to data flow and associated control/status information for the Link Layer to PHY, and the PHY to Link Layer directions.

On both the transmit and receive interfaces, FIFO status information is sent separately from the corresponding data path. By taking FIFO status information out-of-band, it is possible to decouple the transmit and receive interfaces so that each operates independently of the other. Such an arrangement makes POS-PHY L4 suitable not only for bidirectional but also for unidirectional link layer devices. In both the transmit and receive interfaces, the packet's address, delineation information and error control coding is sent in-band with the data.

SPI-4 has the following general characteristics: Point-to-point connection (i.e., between single PHY and single Link Layer device). Support for 256 ports (suitable for STS-1 granularity in SONET/SDH applications (192 ports) and Fast Ethernet granularity in Ethernet applications (100 ports)). Transmit/Receive Data Path: 16 bits wide; In-band port address, start/end-of-packet indication, error-control code; .LVDS I/O (IEEE 1596.3-1996 [1], ANSI/TIA/EIA-644-1995 [2]); 622 Mb/s minimum data rate per line; and Source-synchronous double-edge clocking, 311 MHz minimum.

Transmit/Receive FIFO Status Interface: LVTTL I/O or optional LVDS I/O (IEEE 1596.3-1996 [1], ANSI/TIA/EIA-644-1995 [2]); Maximum ¼ data path clock rate for LVTTL I/O, data path clock rate (double-edge clocking) for LVDS I/O. 2-bit parallel FIFO status indication. In-band Start-of-FIFO Status signal. Source-synchronous clocking.

Figure 2:
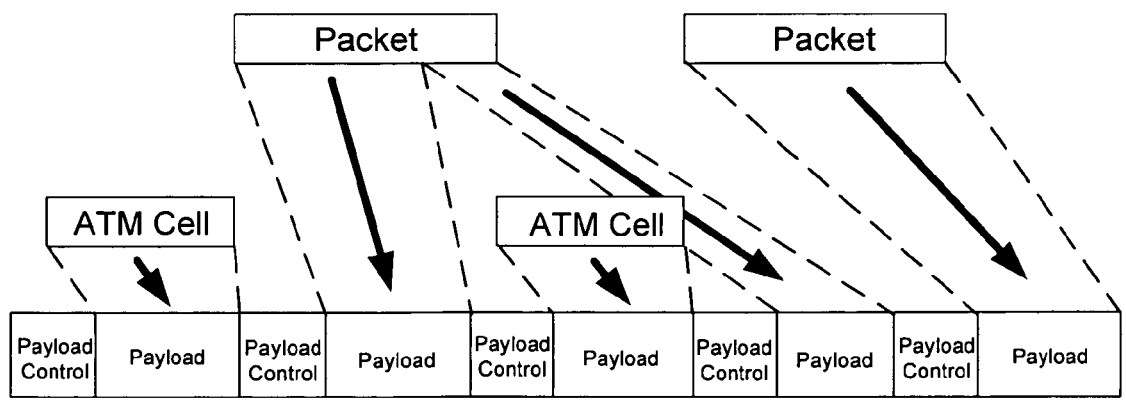
FIG. 2 illustrates the mapping of packets and ATM cells onto the payload stream.

Data is transferred in bursts that have a provisional maximum length, with the exception of transfers that terminate with an EOP. Information associated with each transfer (port address, start/end-of-packet indication and error-control coding) is sent in 16-bit control words described later in this document. FIG. 2 shows how ATM cells and variable-length packets map onto the data stream.

Figure 3:
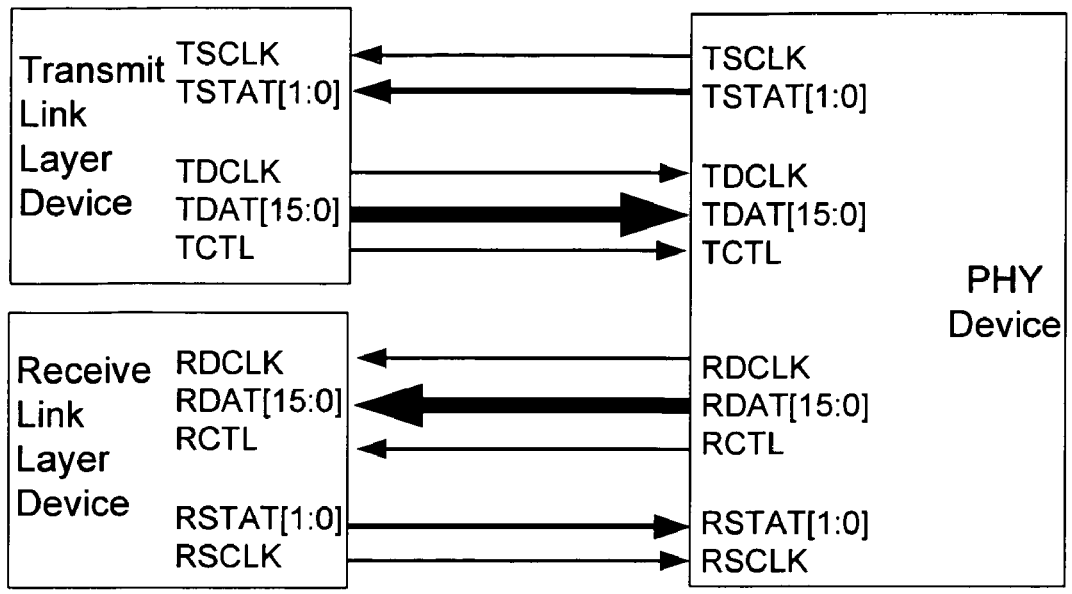
FIG. 3 illustrates the System Packet Interface Level 4 (SPI-4) interface.

A block diagram depicting the interface signals is shown in FIG. 3. The transmit and receive data paths include, respectively, (TDCLK, TDAT[15:0], TCTL) and (RDCLK, RDAT[15:0], RCTL). The transmit and receive FIFO status channels include (TSCLK, TSTAT[1:0]) and (RSCLK, RSTAT[1:0]) respectively. Table 1 provides a summary of the interface signals.

TABLE 1

| Signal | Direction | Description |
| --- | --- | --- |
| TDCLK | Link to PHY | Transmit Data Clock. Clock associated with TDAT and TCTL. Data and control lines are driven off the rising and falling edges of the clock. |
| TDAT [15:0] | Link to PHY | Transmit Data. Used to carry payload data and in-band control words from the Link Layer to the PHY device. The control word format is described in Section 6.2. |
| TCTL | Link to PHY | Transmit Control. TCTL is high when a control word is present on TDAT[15:0]. It is low otherwise. |
| TSCLK | PHY to Link | Transmit Status Clock. Clock associated with TSTAT. |
| TSTAT [1:0] | PHY to Link | Transmit FIFO Status. Used to carry round-robin FIFO status information, along with associated error detection and framing. |
| RDCLK | PHY to Link | Receive Data Clock. Clock associated with RDAT and RCTL. Data and control lines are driven off the rising and falling edges of the clock. |
| RDAT [15:0] | PHY to Link | Receive Data. Carries payload data and in-band control from the PHY to the Link Layer device. The control word format is described in Section 6.2. |
| RCTL | PHY to Link | Receive Control. RCTL is high when a control word is present on RDAT[15:0]. It is low otherwise. |
| RSCLK | Link to PHY | Receive Status Clock. Clock associated with RSTAT. |
| RSTAT [1:0] | Link to PHY | Receive FIFO Status. Used to carry round-robin FIFO status information, along with associated error detection and framing. |

Complete packets or shorter bursts may be transferred, as shown in FIG. 2. The maximum configured payload data transfer size must be a multiple of 16 bytes. Control words are inserted only between burst transfers; once a transfer has begun, data words are sent uninterrupted until end-of-packet or a multiple of 16 bytes is reached. The interval between the end of a given transfer and the next payload control word (marking the start of another transfer) consists of zero or more idle control words and training patterns.

The minimum and maximum supported packet lengths are determined by the application. For ease of implementation however, successive start-of-packets must occur not less than 8 cycles apart, where a cycle is one control or data word. The gap between shorter packets is filled with idle control words.

Figure 4:
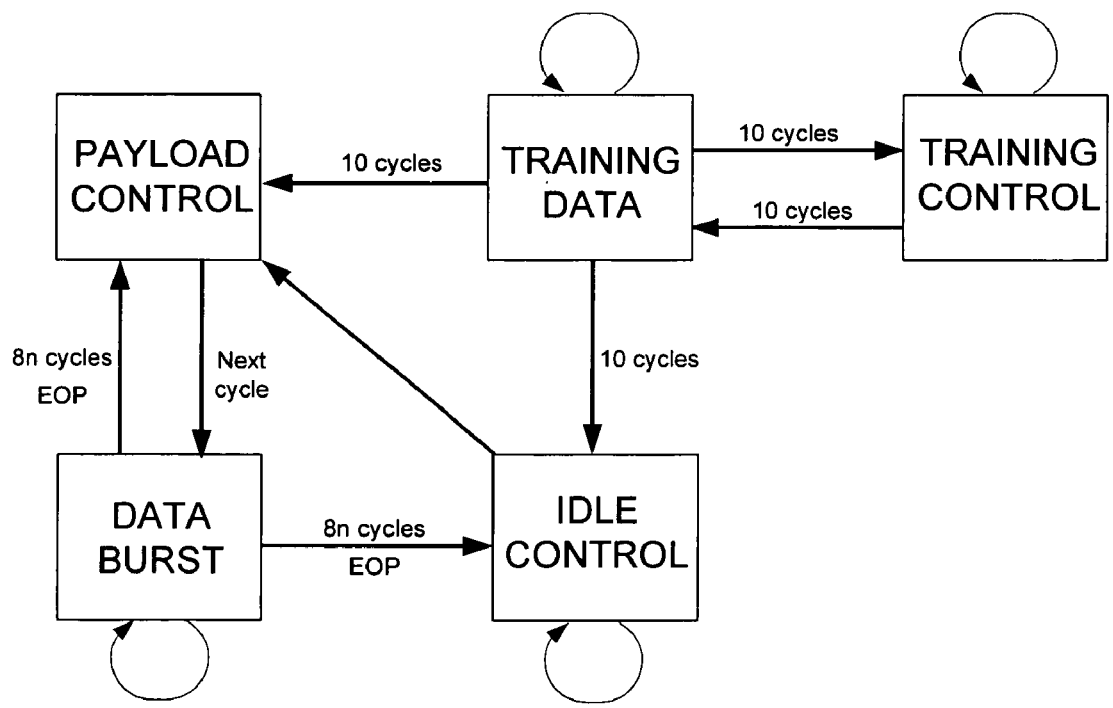
FIG. 4 illustrates the data path through a state diagram.

FIG. 4 shows cycle-by-cycle behavior of the data path for valid state transitions. The states correspond to the type of words transferred on the data path. Transitions from the "Data Burst" state (to "Payload Control" or "Idle Control") are possible only on integer multiples of 8 cycles (corresponding to multiple of 16 byte segmentation) or upon end-of-packet. A data burst must follow a payload control word immediately on the next cycle. Arcs not annotated correspond to single cycles.

Figure 5:
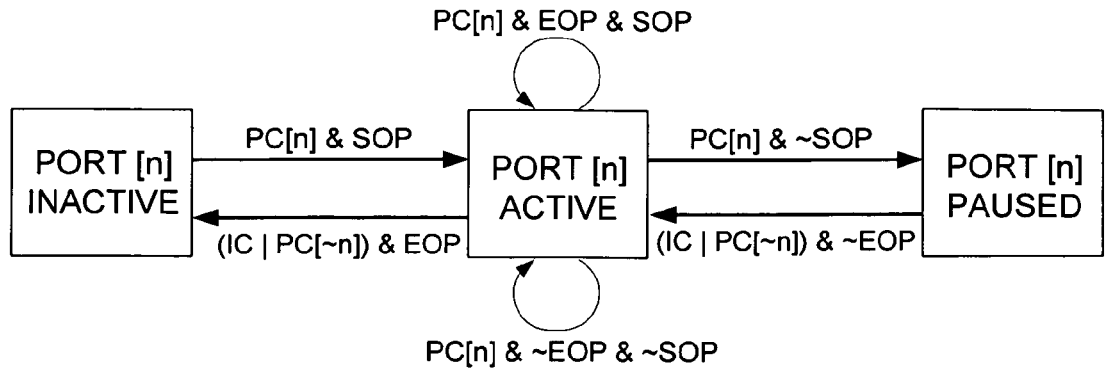
FIG. 5 illustrates a per-port state diagram with transitions at control words.

FIG. 5 shows per-port state transitions at control word boundaries. At any given time, a given port may be active (sending data), paused (not sending data, but pending the completion of an outstanding packet), or inactive (not sending data, no outstanding packet).

Payload data bytes are transferred over the interface in the same order as they would be transmitted or received on the line side. The most significant bits (MSBs) of the constituent bytes correspond to bits 15 and 7. The order in which the bits within each byte are transmitted and received on the line is defined by the Physical Layer and is beyond the scope of this specification. On payload transfers that do not end on an even byte boundary, the unused byte (after the last valid byte) on bit positions 7 through 0 is set to all zeroes.

A common control word format is used in both the transmit and receive interfaces. Table 2 describes the fields in the control word. When inserted in the data path, the control word is aligned such that its MSB is sent on the MSB of the transmit or receive data lines. A payload control word that separates two adjacent burst transfers contains status information pertaining to the previous transfer and the following transfer. The transmitter shall not send Reserved control words. Receivers may ignore Reserved control words and may optionally report an error condition when Reserved control words are observed.

TABLE 2

| Bit Position | Label | Description |
|---|---|---|
| 15 | Type | Control Word Type.<br>Set to either of the following values:<br>1: payload control word (payload transfer will immediately follow the control word).<br>0: idle or training control word (otherwise). |
| 14:13 | EOPS | End-of-Packet (EOP) Status.<br>Set to the following values below according to the status of the immediately preceding payload transfer.<br>0 0: Not an EOP.<br>0 1: EOP Abort (application-specific error condition).<br>1 0: EOP Normal termination, 2 bytes valid.<br>1 1: EOP Normal termination, 1 byte valid.<br>EOPS is valid in the first control word following a burst transfer. It is ignored and set to "0 0" otherwise. |
| 12 | SOP | Start-of-Packet.<br>Set to 1 if the payload transfer immediately following the control word corresponds to the start of a packet. Set to 0 otherwise.<br>Set to 0 in all idle and training control words. |
| 11:4 | ADR | Port Address.<br>8-bit port address of the payload data transfer immediately following the control word. None of the addresses are reserved (all are available for payload transfer).<br>Set to all zeroes in all idle control words.<br>Set to all ones in all training control words. |
| 3:0 | DIP-4 | 4-bit Diagonal Interleaved Parity.<br>4-bit odd parity computed over the current control word and the immediately preceding data words (if any) following the last control word. |

The DIP-4 code is almost as easy to implement as a conventional BIP code. In the presence of random errors, it offers the same error protection capability as a comparable BIP code, but has an additional advantage of spreading single-column errors (as might occur in a single defective line) across the parity bits.

A functional description of calculating the DIP-4 code is given as follows. Assume that the stream of 16-bit data words are arranged with the MSB at the leftmost column, time moving downward. (The first word received is at the top of the figure; the last word is at the bottom of the figure.) The parity bits are generated by summing diagonally (in the control word, the space occupied by the DIP-4 code (bits a,b,c,d) is set to all 1's during encoding). The first 16-bit checksum is split into two bytes, which are added to each other modulo-2 to produce an 8-bit checksum. The 8-bit checksum is then divided into two 4-bit nibbles, which are added to each other modulo-2 to produce the final DIP-4 code. The procedure described applies to either parity generation on the egress path or to check parity on the ingress path.

Figure 6:
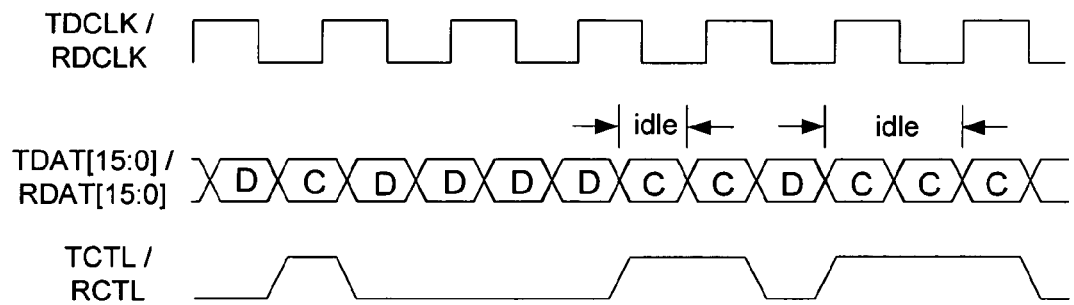
FIG. 6 illustrates a data path timing diagram for SPI-4.

A timing diagram of the data path signals is shown in FIG. 6. This diagram is applicable to either the transmit or the receive interface. TCTL/RCTL is high when TDAT/RDAT contain control words. Idle periods correspond to back-to-back control words. The actual clock rate used in practice is determined by the application at hand.

FIFO status information is sent periodically over the TSTAT link from the PHY to the Link Layer device, and over the RSTAT link from the Link Layer to the PHY device. Implementation of the FIFO status channel for the transmit interface is mandatory; the corresponding implementation for the receive interface is optional. If both status channels are implemented, they shall operate independently of each other.

Figure 7:
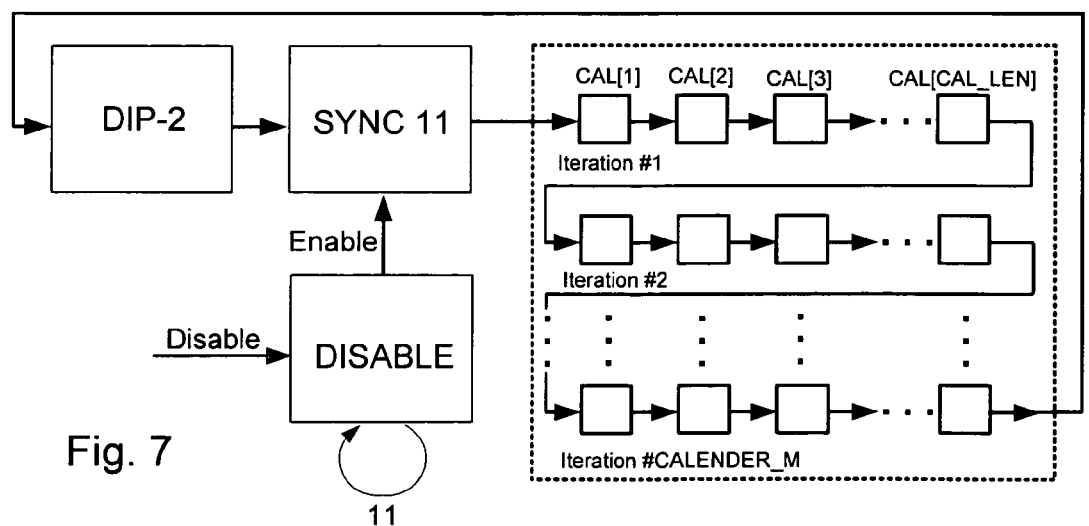
FIG. 7 illustrates a FIFO status state diagram for the sending side.

FIG. 7 shows the operation of the FIFO status channel. The sending side of the FIFO status channel is initially in the DISABLE state and sends the "1 1" pattern repeatedly. When FIFO status transmission is enabled, there is a transition to the SYNC state and the "1 1" framing pattern is sent. FIFO status words are then sent according to the calendar sequence, repeating the sequence CALENDAR_M times followed by the DIP-2 code. FIFO status reporting can be reset to the "DISABLE" state by an implementation-specific "Disable" command.

The FIFO status of each port is encoded in a 2-bit data structure, whose format is defined in Table 3. The most significant bit of each port status is sent over TSTAT/RSTAT [1], while the least significant bit is sent over TSTAT/RSTAT [0]. The port sequences on the transmit and receive interfaces may be configured differently from each other. The "1 1" pattern is reserved for in-band framing; it must be sent once prior to the start of the FIFO status sequence.

TABLE 3

| MSB | LSB | Description |
|---|---|---|
| 1 | 1 | Reserved for framing or to indicate a disabled status link. |
| 1 | 0 | SATISFIED<br>Indicates that the corresponding port's FIFO is almost full. When SATISFIED is received, only transfers using the remaining previously granted 16-byte blocks (if any) may be sent to the corresponding port until the next status update. No additional transfers to that port are permitted while SATISFIED is indicated. |
| 0 | 1 | HUNGRY<br>When HUNGRY is received, transfers for up to MaxBurst2 16-byte blocks or the remainder of what was previously granted (whichever is greater) may be sent to the corresponding port until the next status update. |
| 0 | 0 | STARVING<br>Indicates that buffer underflow is imminent in the corresponding PHY port. When STARVING is received, transfers for up to MaxBurst1 16-byte blocks may be sent to the corresponding port until the next status update. |

A DIP-2 odd parity checksum is sent at the end of each complete sequence, immediately before the "1 1" framing pattern. The DIP-2 code is computed over all preceding FIFO status indications sent after the last "1 1" framing pattern, diagonally over TSTAT/RSTAT [1] and TSTAT/

RSTAT [0]. The procedure described applies to either parity generation on the egress path or to check parity on the ingress path.

Figure 8:
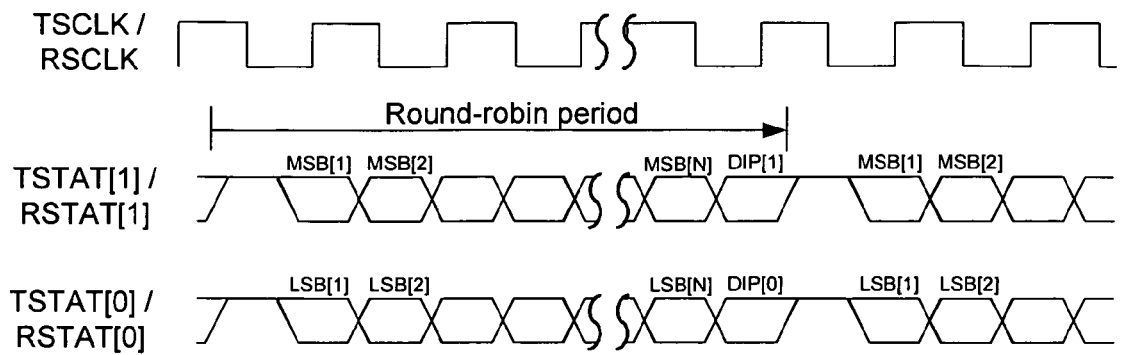
FIG. 8 illustrates a FIFO status channel timing diagram.

While the parity bits can mimic the "1 1" pattern, the receiving end can still frame successfully by syncing onto the last cycle in a repeated "1 1" pattern and by making use of the configured length of the sequence when searching for the framing pattern. A timing diagram of the FIFO status channel is shown in FIG. 8. To permit more efficient FIFO utilization, the MaxBurst1 and MaxBurst2 credits are granted and consumed in increments of 16-byte blocks. For any given port, these credits correspond to the most recently received FIFO status. They are not cumulative and supersede previously granted credits for the given port. A burst transfer shorter than 16 bytes (e.g., end-of-packet fragment) will consume an entire 16-byte credit.

A continuous stream of repeated "1 1" framing patterns indicates a disabled status link. For example, it may be sent to indicate that data path deskew has not yet been completed or confirmed. When a repeated "1 1" pattern is detected, all outstanding credits are cancelled and set to zero.

The indicated FIFO status is based on the latest available information. A STARVING indication provides additional feedback information, so that transfers can be scheduled accordingly. Applications which do not need to distinguish between HUNGRY and STARVING may only examine the most significant FIFO status bit.

Applications which require higher FIFO Status Channel bandwidths than feasible with LVTTL I/O, may optionally use LVDS I/O instead. If LVDS I/O is used, double-edge clocking is used on TSCLK and RSCLK, running at the same rate as the corresponding data path rate. The framing structure and operation of TSTAT[1:0] and RSTAT[1:0] remain unchanged. AC timing parameters for an LVDS FIFO Status Channel are defined below.

A training sequence is scheduled to be sent at least once every preconfigured bounded interval (FIFO_MAX_T) on both the transmit and receive FIFO Status interfaces. These training sequences may be used by the receiving end of each interface for deskewing bit arrival times on the FIFO status and control lines. Training sequences may only be inserted between the DIP-2 code of the preceding cycle and the SYNC (1 1) word of the next calendar sequence. The sequence defined in this section is designed to allow the receiving end to correct for relative skew differences of up to +/−1 bit time. The training pattern consists of ten words of "0 0" followed by ten words of "1 1". The length of the training sequence can optionally be extended by repeating the 20 cycle pattern as many times as necessary. When using LVDS I/O and the training sequence on the FIFO Status Channel, the product of CALENDAR_LEN and CALENDAR_M (CALENDAR_LEN*CALENDAR_M) must be greater than or equal to sixteen to be able to distinguish between FIFO status information and the training sequence.

The training sequence is chosen so that it can be distinguished from a valid FIFO Status Channel message. In the absence of bit errors in the training pattern, a receiver should be able to successfully deskew the FIFO Status lines with one training pattern. Setting FIFO_MAX_T equal to zero will disable the training sequence.

A training sequence is scheduled to be sent at least once every preconfigured bounded interval (DATA_MAX_T) on both the transmit and receive data paths. These training sequences may be used by the receiving end of each interface for deskewing bit arrival times on the data and control lines. The sequence defined in this section is designed to allow the receiving end to correct for relative skew differences of up to +/−1 bit time. The training sequence consists of 1 idle control word followed by one or more repetitions of a 20-word training pattern consisting of 10 (repeated) training control words and 10 (repeated) training data words. The initial idle control word removes dependencies of the DIP-4 in the training control words from preceding data words. Assuming a maximum of +/−1 bit time in bit alignment jitter on each line, and a maximum of +/−1 bit time relative skew between lines, there will be at least 8 bit times during which a receiver can detect a training control word prior to deskew. The training data word is chosen to be orthogonal to the training control word. In the absence of bit errors in the training pattern, a receiver should be able to successfully deskew the data and control lines with one training pattern.

The sending side of the data path on both the transmit and receive interfaces must schedule the training sequence in Table 4 (from cycles 1 through $20\alpha+1$) at least once every DATA_MAX_T cycles, where DATA_MAX_T and $\alpha$ are configurable on start-up. Training sequences at the transmit and receive interfaces are scheduled independently. They must not be inserted within a payload burst transfer (i.e., not inserted between a payload control word and any of the subsequent data words until the end of transfer). Setting DATA_MAX_T equal to zero will disable the training sequence. Note that the DIP-4 code of the first control word following the training pattern is not affected by the preceding training data words, because an even number of training data words produces no net DIP-4 contribution.

TABLE 4

| Cycle | TCTL/RCTL | \multicolumn{16}{c}{TDAT[i]/RDAT[i]} | | | | | | | | | | | | | | | |
|---|---|---|---|---|---|---|---|---|---|---|---|---|---|---|---|---|---|
| | | 15 | 14 | 13 | 12 | 11 | 10 | 9 | 8 | 7 | 6 | 5 | 4 | 3 | 2 | 1 | 0 |
| 1 | 1 | 0 | X | X | 0 | 0 | 0 | 0 | 0 | 0 | 0 | 0 | 0 | a | b | c | d |
| 2 to 11 | 1 | 0 | 0 | 0 | 0 | 1 | 1 | 1 | 1 | 1 | 1 | 1 | 1 | 1 | 1 | 1 | 1 |
| 12 to 21 | 0 | 1 | 1 | 1 | 1 | 0 | 0 | 0 | 0 | 0 | 0 | 0 | 0 | 0 | 0 | 0 | 0 |
| $20\alpha - 18$ to $20\alpha - 9$ | 1 | 0 | 0 | 0 | 0 | 1 | 1 | 1 | 1 | 1 | 1 | 1 | 1 | 1 | 1 | 1 | 1 |
| $20\alpha - 8$ to $20\alpha + 1$ | 0 | 1 | 1 | 1 | 1 | 0 | 0 | 0 | 0 | 0 | 0 | 0 | 0 | 0 | 0 | 0 | 0 |

The sequence of ports at a FIFO status channel is defined in a data structure called CALENDAR, where CALENDAR[i], i=1, . . . , CALENDAR_LEN, refers to the ith port in the repeating sequence. CALENDAR_LEN typically corresponds to the number of ports with the lowest data rate that can be accommodated in the total data rate of the given application. CALENDAR_LEN must be at least as large as the number of active ports in the system. The calendar sequence (of length CALENDAR_LEN) is repeated CALENDAR_M times before the DIP-2 parity and "1 1" framing words are inserted. CALENDAR_LEN and CALENDAR_M are both greater than zero.

EXAMPLES

1. Single OC-192 or 10 Gb/s Ethernet port: CALENDAR_LEN=1, CALENDAR[1]=1.
2. Four OC-48 ports: CALENDAR_LEN=4, CALENDAR[i]=1, 2, 3, 4.
3. Two OC-48 channels (ports 1 and 2), eight OC-12 channels (ports 3 through 10): CALENDAR_LEN=16, CALENDAR[i]=1, 2, 3, 4, 1, 2, 5, 6, 1, 2, 7, 8, 1, 2, 9, 10, . . . . Other combinations are feasible: CALENDAR[i]= 1, 3, 2, 4, 1, 5, 2, 6, 1, 7, 2, 8, 1, 9, 2, 10, . . .
4. Ten 1 Gb/s Ethernet ports: CALENDAR_LEN=10, CALENDAR[i]=1, 2, 3, 4, 5, 6, 7, 8, 9, 10.

The values of CALENDAR_LEN, CALENDAR_M and CALENDAR[i], i=1, . . . , CALENDAR_LEN, must be identical in both the PHY and Link Layer devices for each interface. They need not be identical on both the transmit and receive FIFO status channels. The maximum supported value of CALENDAR_LEN is contained in the parameter MAX_CALENDAR_LEN, whose upper bound is implementation-specific. MAX_CALENDAR_LEN need not be identical on either side of the transmit or receive FIFO status channels. Users however, must ensure that the value of CALENDAR_LEN on the sending side of a FIFO status channel must not exceed MAX_CALENDAR_LEN on the receiving side.

For the FIFO Status channel(s), MaxBurst1 and MaxBurst2 may be configured to apply globally over all ports, or to apply on a per-port basis. In either case, both parameters must be consistently configured at the PHY and Link Layer devices for each interface, but need not be identical between the transmit and receive interfaces. MaxBurst1 must not be less than the corresponding MaxBurst2 (at the same port and interface). For the data path deskew procedure, DATA_MAX_T is configured only on the sending side of the data paths on the transmit and receive interfaces. DATA_MAX_T need not be identical over both interfaces.

Upon reset, the FIFOs in the datapath receiver are emptied, and any outstanding credits are cleared in the data path transmitter. After reset, but before active traffic is generated, the data transmitter shall send continuous training patterns. Transmission of training patterns shall continue until valid information is received on the FIFO Status Channel. The receiver shall ignore all incoming data until it has observed the training pattern and acquired synchronization with the data. Synchronization may be declared after a provisionable number of consecutive correct DIP-4 codewords are seen. Loss of synchronization may be reported after a provisionable number of consecutive incorrect DIP-4 codewords is detected.

After reset but before active traffic is generated, the FIFO Status Channel transmitter shall send a continuous "1 1" framing pattern for LVTTL implementations, or continuous training patterns for optional LVDS implementations. Once the corresponding data channel has achieved synchronization, and a calendar has been provisioned, it may begin transmission of FIFO Status information. Once the data transmitter has received valid FIFO Status information (as indicated, for example, by a sufficient number of consecutively correct DIP-2 codewords), it may begin transmission of data bursts to channels that have been provisioned and have space available.

In the event that the data path receiver is reset but the transmitter is still active, events at the receiver follow the same behavior as above. It shall ignore all incoming data until it has observed the training pattern and acquired synchronization with the data. It shall also send a continuous "1 1" framing pattern for LVTTL implementations (or continuous training patterns for optional LVDS implementations) on its FIFO Status Channel, canceling previously granted credits and setting them to zero. In this case the transmitter should send continuous training patterns to facilitate reacquisition by the receiver.

Figure 9:
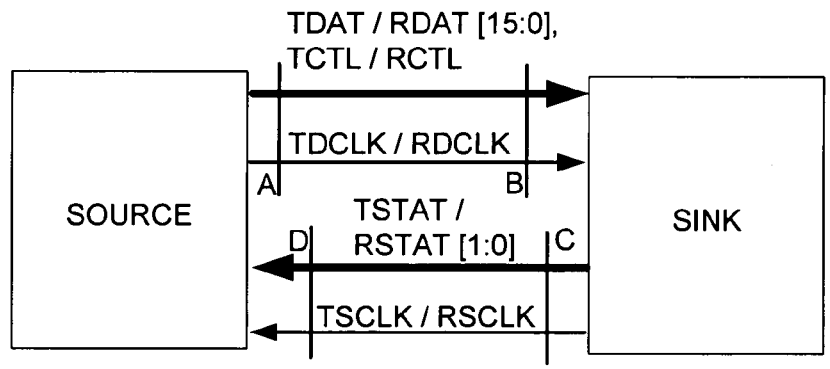
FIG. 9 illustrates the system-level reference points for AC timing parameters.
Figure 10:
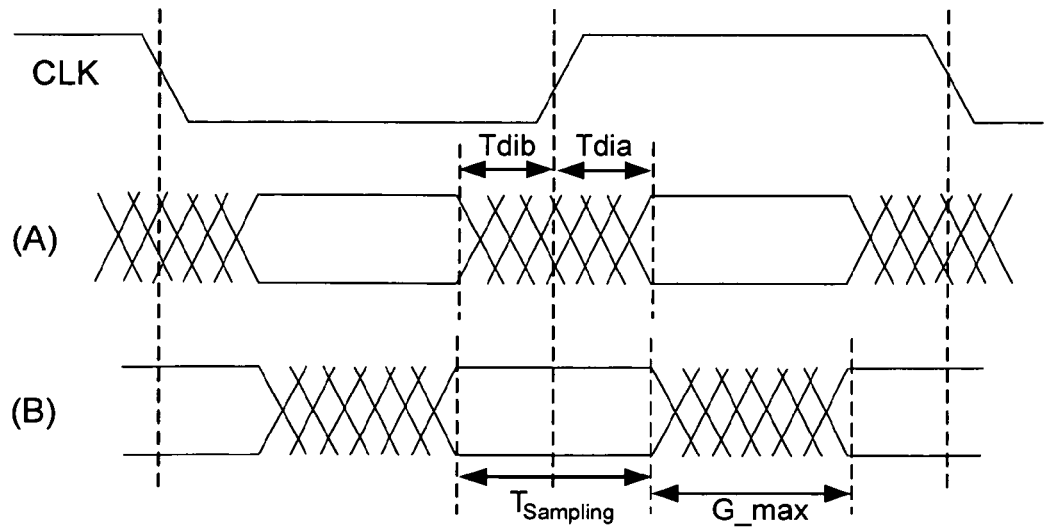
FIG. 10 illustrates certain reference points with respect to the clock edge.
Figure 11:
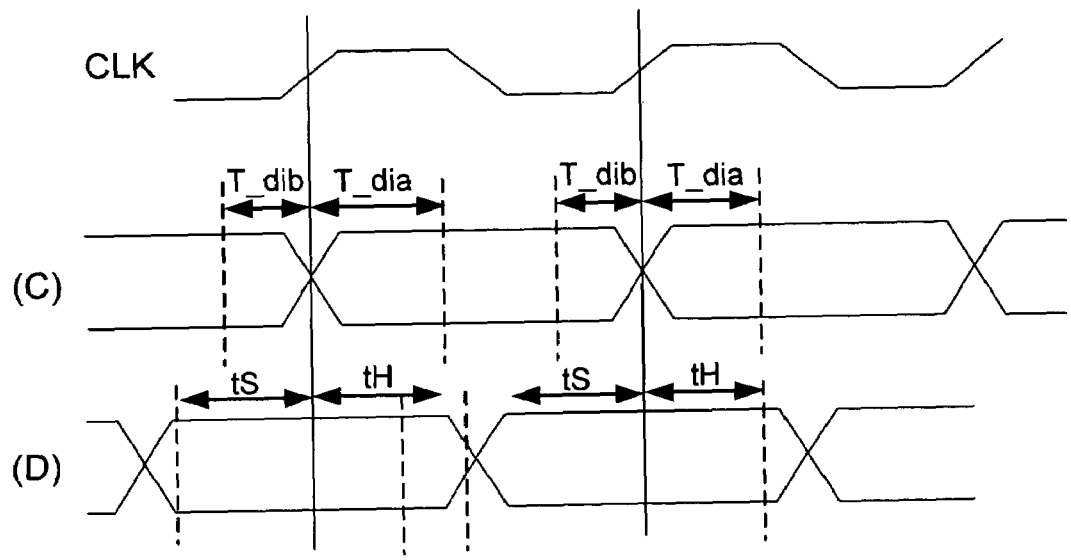
FIG. 11 illustrates certain reference points with respect to the clock edge.

In the event that the data path transmitter is reset but the receiver is still active, events at the transmitter follow the same behavior as above. The transmitter shall send continuous training patterns until a calendar is configured and valid status information is received on the FIFO Status Channel. At the same time, the receiver may have lost synchronization with the data, and begun sending continuous framing patterns (or continuous training patterns for optional LVDS implementations) on the FIFO Status Channel. Once the data transmitter has received valid FIFO Status information (as indicated, for example, by a sufficient number of consecutively correct DIP-2 codewords), it may begin transmission of data bursts to channels that have been provisioned and have space available. System-level reference points for specified parameters in this section are shown in FIG. 9. Corresponding reference points with respect to the clock edge are shown in FIGS. 10 and 11

The SPI4 Phase2 uses a training seqence as described in TABLE 5 to deskew the data path which consists 16-bit data bus and one bit control line. A training sequence is scheduled to be sent after power on, detection of disable state and once every pre-configured bounded interval (MAX_T) on both direction of data paths.

TABLE 5

| T | 20a + 1 | 20a − 8 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|
| C | 0 | 1 | 0 | 0 | 0 | 0 | 0 | 0 | 0 | 0 | 0 | 0 | 1 | 1 | 1 | 1 | 1 | 1 | 1 | 1 | 1 | 1 | 1 |
| 15 | 1 | 0 | 1 | 1 | 1 | 1 | 1 | 1 | 1 | 1 | 1 | 1 | 0 | 0 | 0 | 0 | 0 | 0 | 0 | 0 | 0 | 0 | 0 |
| 14 | 1 | 0 | 1 | 1 | 1 | 1 | 1 | 1 | 1 | 1 | 1 | 1 | 0 | 0 | 0 | 0 | 0 | 0 | 0 | 0 | 0 | 0 | x |
| 13 | 1 | 0 | 1 | 1 | 1 | 1 | 1 | 1 | 1 | 1 | 1 | 1 | 0 | 0 | 0 | 0 | 0 | 0 | 0 | 0 | 0 | 0 | x |
| 12 | 1 | 0 | 1 | 1 | 1 | 1 | 1 | 1 | 1 | 1 | 1 | 1 | 0 | 0 | 0 | 0 | 0 | 0 | 0 | 0 | 0 | 0 | 0 |
| 11 | 0 | 1 | 0 | 0 | 0 | 0 | 0 | 0 | 0 | 0 | 0 | 0 | 1 | 1 | 1 | 1 | 1 | 1 | 1 | 1 | 1 | 1 | 1 |
| 10 | 0 | 1 | 0 | 0 | 0 | 0 | 0 | 0 | 0 | 0 | 0 | 0 | 1 | 1 | 1 | 1 | 1 | 1 | 1 | 1 | 1 | 1 | 1 |
| 9 | 0 | 1 | 0 | 0 | 0 | 0 | 0 | 0 | 0 | 0 | 0 | 0 | 1 | 1 | 1 | 1 | 1 | 1 | 1 | 1 | 1 | 1 | 1 |
| 8 | 0 | 1 | 0 | 0 | 0 | 0 | 0 | 0 | 0 | 0 | 0 | 0 | 1 | 1 | 1 | 1 | 1 | 1 | 1 | 1 | 1 | 1 | 1 |
| 7 | 0 | 1 | 0 | 0 | 0 | 0 | 0 | 0 | 0 | 0 | 0 | 0 | 1 | 1 | 1 | 1 | 1 | 1 | 1 | 1 | 1 | 1 | 1 |
| 6 | 0 | 1 | 0 | 0 | 0 | 0 | 0 | 0 | 0 | 0 | 0 | 0 | 1 | 1 | 1 | 1 | 1 | 1 | 1 | 1 | 1 | 1 | 1 |

TABLE 5-continued

| T | 20a + 1 | 20a − 8 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|
| 5 | 0 | 1 | 0 | 0 | 0 | 0 | 0 | 0 | 0 | 0 | 0 | 0 | 1 | 1 | 1 | 1 | 1 | 1 | 1 | 1 | 1 | 1 | 1 |
| 4 | 0 | 1 | 0 | 0 | 0 | 0 | 0 | 0 | 0 | 0 | 0 | 0 | 1 | 1 | 1 | 1 | 1 | 1 | 1 | 1 | 1 | 1 | 1 |
| 3 | 0 | 1 | 0 | 0 | 0 | 0 | 0 | 0 | 0 | 0 | 0 | 0 | 1 | 1 | 1 | 1 | 1 | 1 | 1 | 1 | 1 | 1 | a |
| 2 | 0 | 1 | 0 | 0 | 0 | 0 | 0 | 0 | 0 | 0 | 0 | 0 | 1 | 1 | 1 | 1 | 1 | 1 | 1 | 1 | 1 | 1 | b |
| 1 | 0 | 1 | 0 | 0 | 0 | 0 | 0 | 0 | 0 | 0 | 0 | 0 | 1 | 1 | 1 | 1 | 1 | 1 | 1 | 1 | 1 | 1 | c |
| 0 | 0 | 1 | 0 | 0 | 0 | 0 | 0 | 0 | 0 | 0 | 0 | 0 | 1 | 1 | 1 | 1 | 1 | 1 | 1 | 1 | 1 | 1 | d |

These training sequences may be used by the receiving end of each interface for deskewing bit arrival times on the data and control lines. To be compliant with the SPI4 Phase2 specification, each interface allows the receiving end to correct for relative skew difference of up to +/−1 bit time.

The training sequence consists of 1 idle control word followed by 10(repeated) training control words and 10 (repeated) training data words. The analog block does the mux/de-mux and data recovery function before presenting a total 68-bit data and control lines to deskew block.

There are two different bit alignment schemes at the receiver, static alignment and dynamic alignment. In the case of "static alignment", in which the receiver latches data at a fixed point in time relative to clock (requiring a more precisely specified sampling window), for the case of "dynamic alignment", in which the receiver has the capability of centering the data and control bits relative to clock.

From an AC timing perspective, a compliant interface only needs to meet the parameters at the data path for either static or dynamic alignment, but may also comply to both. A compliant driver must meet both timing specifications to be interoperable with both types of receivers.

The method of the present invention provides for many enhancements. New added and improved features that are implemented are:

Deskew up to 5-bit distance;
Able to deskew with only one training pattern;
Options for TX skew insertion up to 5-bit distance programmable in real time;
Allow Receiver manual deskew per bit line for up to 5-bit distance;
Allow bit swap and invert for both TX and RX independently;
Option to freeze the current deskew position, can emulate static timing for interoperability;
Real time monitoring and debugging the deskew status through test registers;
Self training using LoopBack mode; and
Merged digital loopback with skew function, resulting in better performance.

There are more than 12.5 ns, 5-bit, tolerance for any bit line skew at total accumulation, including temperature, process, data recovery, PCB trace distortion and noise interference, at maximum 800 Mhz data rate. Theoretically, this deskew method can tolerate up to 9 bit skew, but the 5-bit deskew capability should be more than enough to do the job.

Interoperability is a main concern with the current architecture. Under current data recovery implementation, there is a risk of failure of the per bit deskew if the third party SPI4 transmitter does NOT sending out training sequence periodically, while the data recovery circuitry reset itself, Out of Range, this will cause bit shift during data transmission and all the following packets will be dropped. The worst scenario are system up and down oscillation and excessive packet drops. To avoid this situation, we need to put some options to be able to fine tune both the data recovery and digital deskew logic, such as manual per bit line deskew, tracking freeze and programmable algorithms.

Due to those new added features and options, there are eight new registers needed. They are: conf_rx_skew_0; conf_tx_skew_0; conf_rx_skew_1; conf_tx_skew_1; conf_rx_skew_2; conf_tx_skew_2; control conf_rx_skew_0; and conf_tx_skew_0.

There are only two new added signals, rxdll_freeze and rxdll_oor, to and from SPI4 analog module. The rxdll_freeze will be asserted when all bit line aligned and internal state machine sync up. This signal could also be forced to be 0, conf_rx_skew_3[12], to emulate static alignment for greater interoperability.

For better performance, several options are combined into one logic block which consists of digital loopback, bit order swapping, bit inverting and manual skew insertion, on both TX and RX side of data path. Those capabilities give a lot of flexibility to system integrator and testing.

Due to the difficulty of final timing closure between SPI4 analog block and digital block, there is a major change in clocking scheme. The change is made to the TX side that now has the digital block is supplying both the 64-bit data line and control line along with source sync clock to the analog block, atdclk4_dig. On the other hand, the analog block needs to take in both data and clock at the same time.

Figure 16:
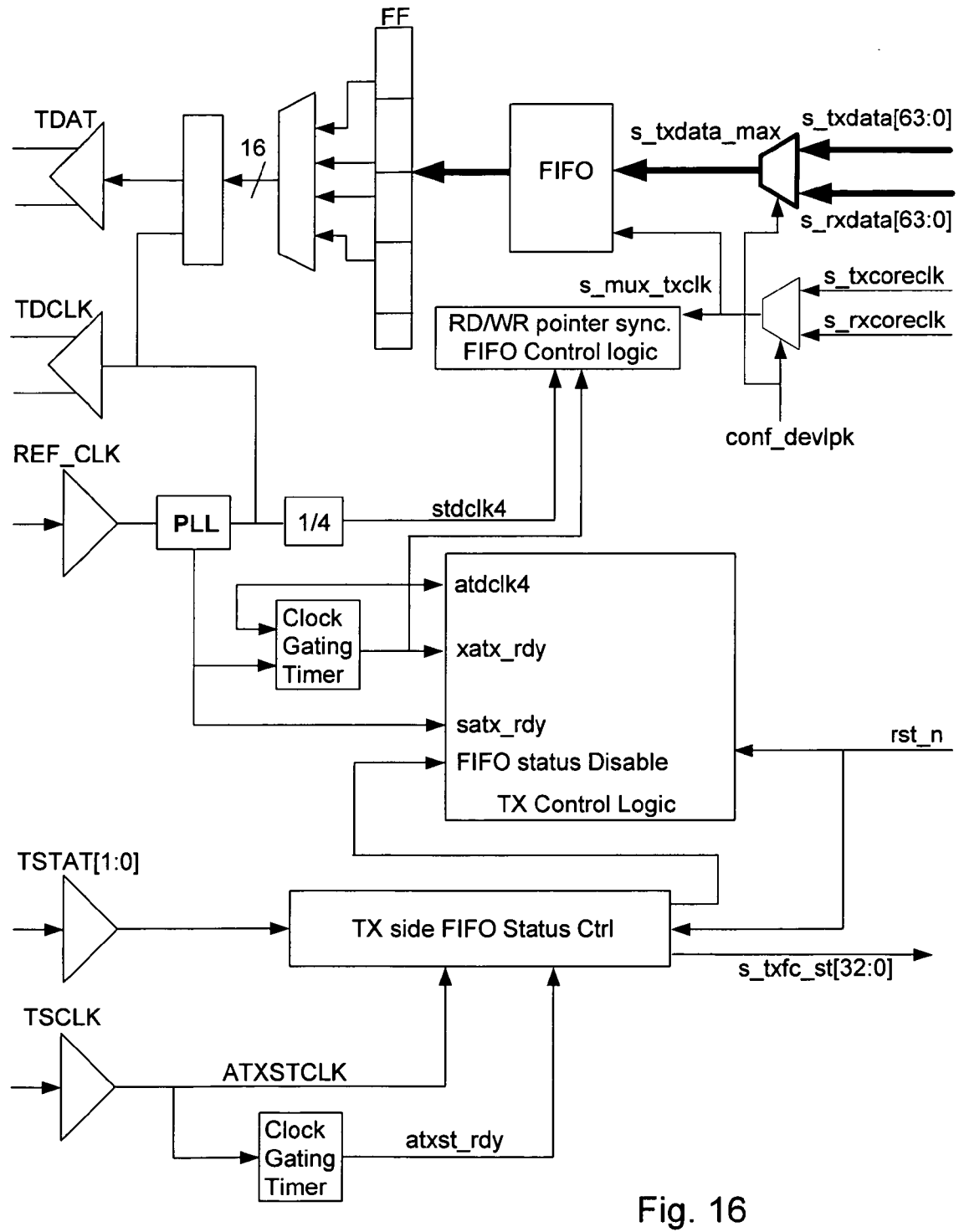
FIG. 16 illustrates a clock scheme and reset sequences for transmission.
Figure 17:
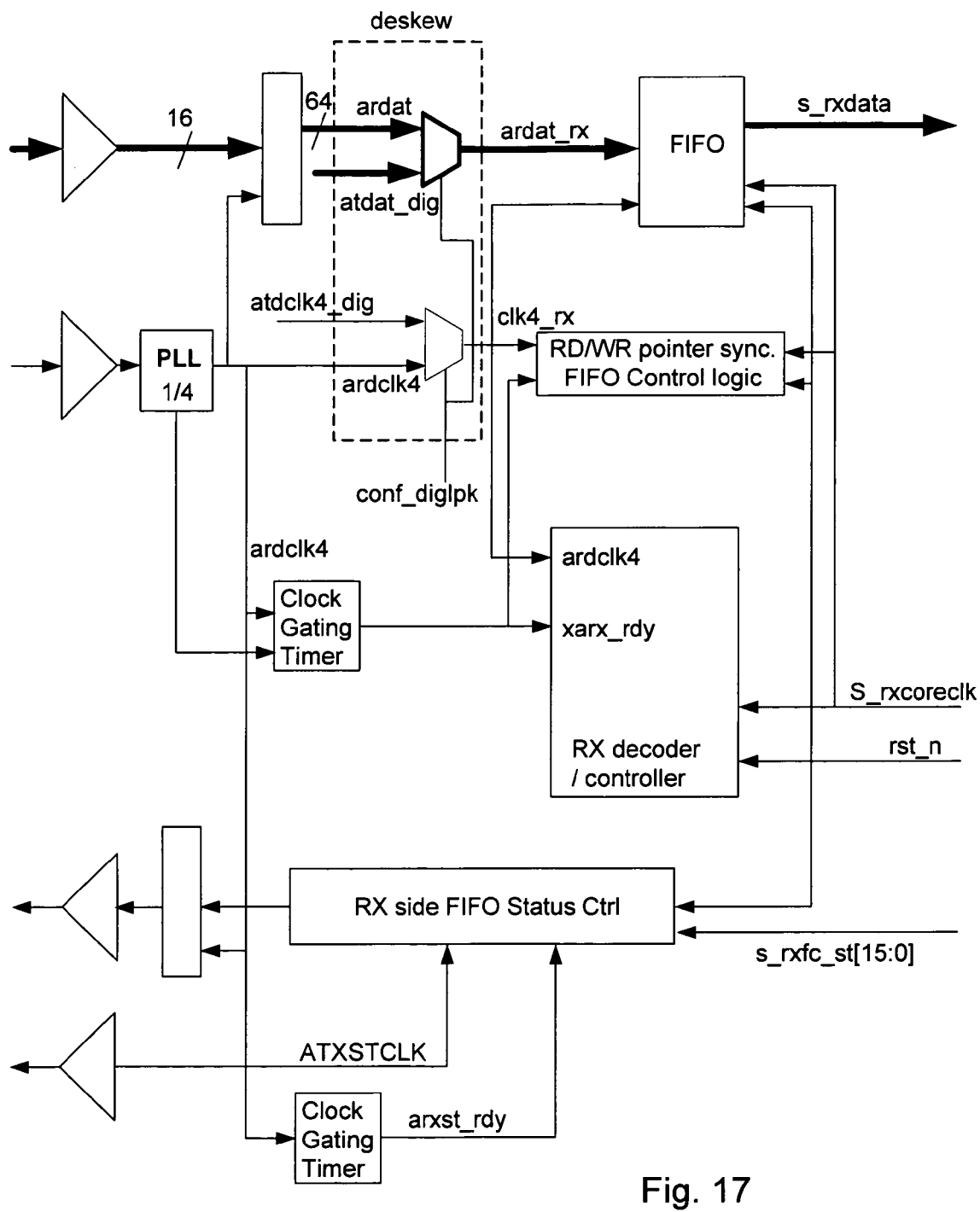
FIG. 17 illustrates a clock scheme and reset sequences for receipt.

Both SPI4 digital block and 10G block have been integrated into one synthesis entity. The reason for that is trying to get better timing and easier for placement and routing. Due to this major change, some clocks and resets which were derived from SPI4, now no longer exist. Please reference to RX and TX clocking and reset diagram at the end of this document, i.e. FIGS. 16 and 17, which are discussed in greater detail below.

The data path skew control is done in two levels: bit-level and word-level. The bit-level circuit will recover data independently on each channel. The data recover circuitry will latch/sample each bit line at adjustable clock phase, 32 phases, the circuit will track each bit transition through a low pass filter and feed back the optimal sample position to latch data the best point.

Under current design, the digital logic is running at ¼ low speed of TDCLK domain so it can be adapted to future OIF standards revision, likes SPI5. All "locked" data, 64-bit, will be sent to new added block, s4_deskew, to do deskew operation and then feed those "aligned" data and control into current SPI4 RX module.

Figure 13:
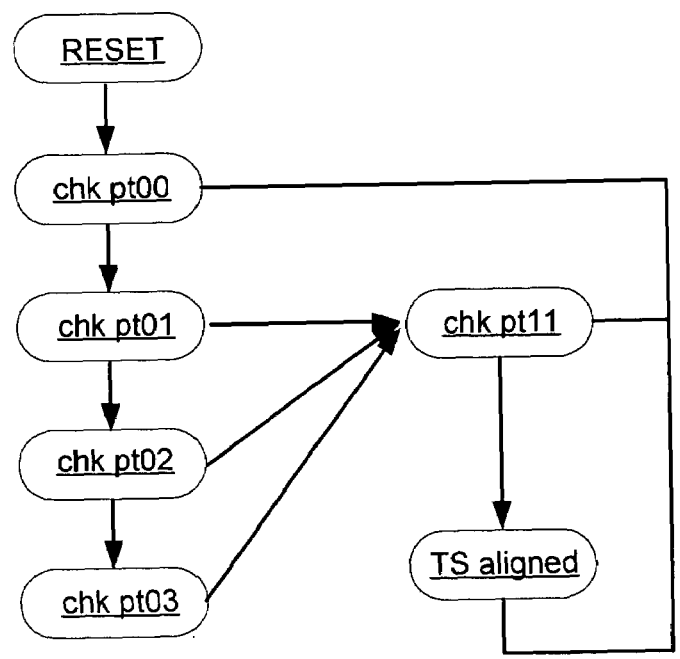
FIG. 13 illustrates the general process of checking to determine if the bit lines are aligned.
Figure 12:
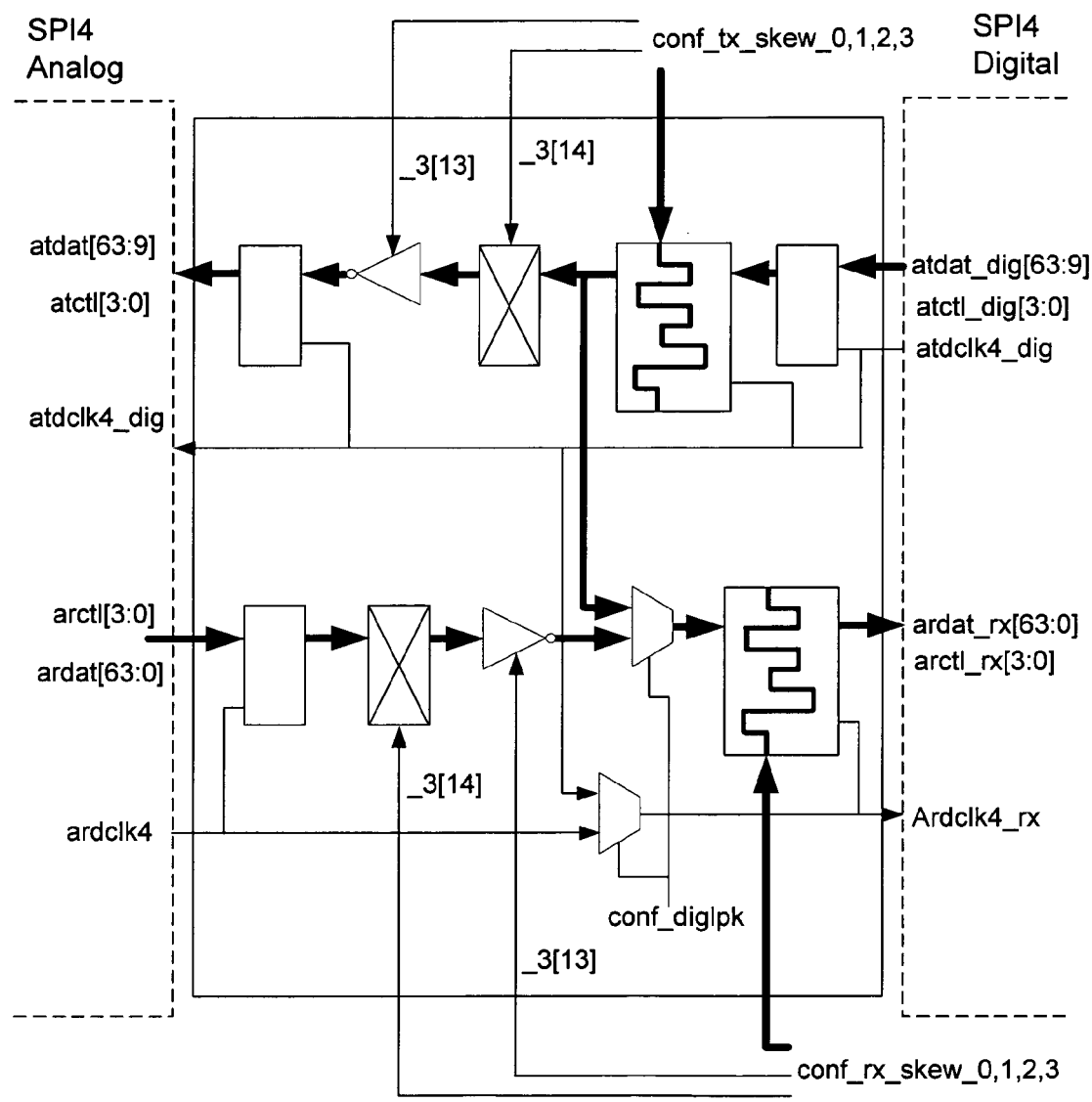
FIG. 12 illustrates the per-bit deskew data path and clocking with digital loopback.
Figure 14:
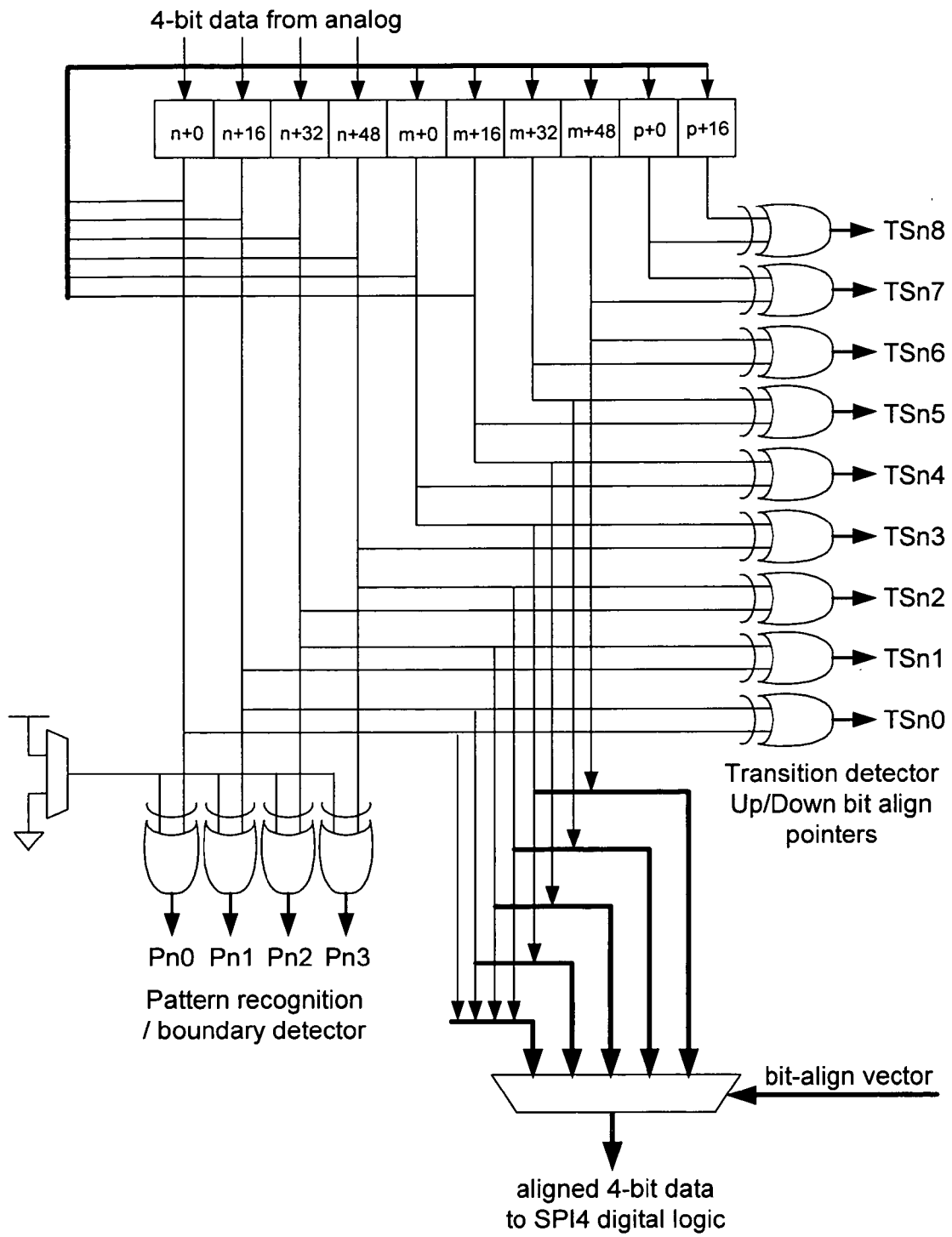
FIG. 14 illustrates examples of bit line detection and alignment circuits, according to one embodiment of the present invention.
Figure 15:
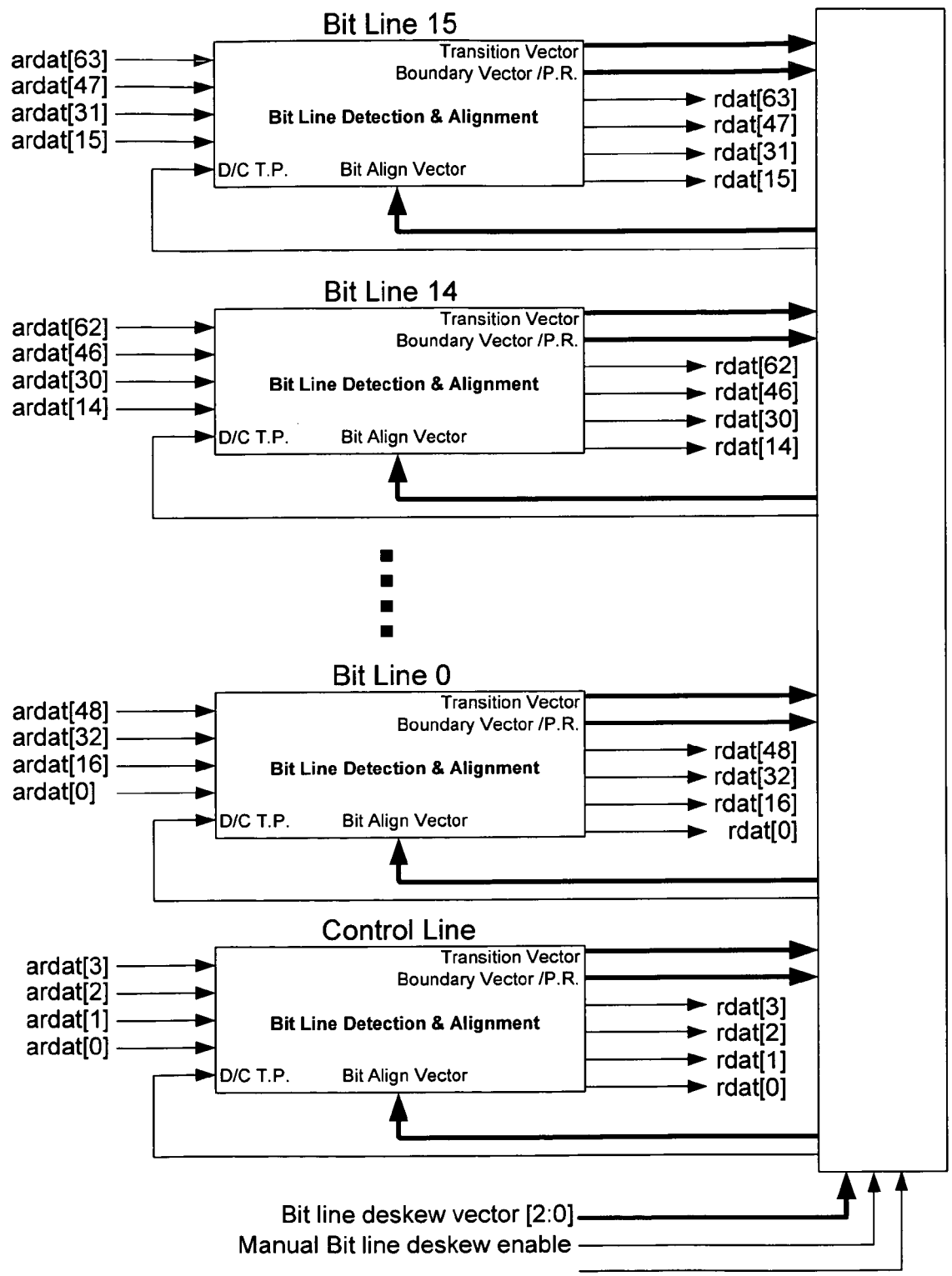
FIG. 15 illustrates a functional block diagram for the per-bit deskew, according to one embodiment of the present invention.

The FIG. 14 shows the basic logic block built for each bit line, there are three main logic functions, vertical pattern recognition, horizontal skew distance pointer and direct skew correction. The basic flows are: collect all vertical line info to match certain pattern based on training pattern, either 0FFF or F000, after pattern matched, the horizontal logic calculate the skew distance then base on those skew distances, the correct data line can be direct mapped. The flow chart in FIG. 13 shows the detailed flows.

The above method can easily implemented and flexibly scaled from +/−1 bit up to +/−4-bit without change the algorithm, but need to add more registers to latch deeper data and wider direct mapping pointer and mux for selecting correct time frame for each bit line. The TABLE 6 shows an example with 5-bit skew, +/−2 bit distance.

| | |
|---|---|
| 000 | no skew inserted |
| 001 | one bit skew inserted |
| 010 | two bit skew inserted |
| 011 | three bit skew inserted |
| 100 | four bit skew inserted |
| 101 | five bit skew inserted |
| 110–111 | no skew inserted |

TABLE 6

| T | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|
| C | 0 | 0 | 0 | 0 | 0 | 0 | 0 | 0 | 0 | 0 | 1 | 1 | 1 | 1 | 1 | 1 | 1 | 1 | 1 | 1 | x | x | x |
| 15 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | x |
| 14 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | x |
| 13 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | x |
| 12 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | x |
| 11 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | x |
| 10 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | x |
| 9 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | x |
| 8 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | x |
| 7 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | x |
| 6 | 0 | 0 | 0 | 0 | 0 | 0 | 0 | 0 | 0 | 0 | x | 1 | 1 | 1 | 1 | 1 | 1 | 1 | 1 | 1 | 1 | 1 | x |
| 5 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | x |
| 4 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | x |
| 3 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | x |
| 2 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | x |
| 1 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | x |
| 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | x |

At time 0: it could be an idle when in normal data operation or "don't care", most likely will be "0" after power on reset condition.

At time 1: the circuit will always be looking for any "real" training pattern whether is coming to the SPI4 interface, assuming it is training control word with 5-bit skew distance.

At time 7: this is the first recognized training pattern could be detected by the vertical pattern recognition logic. The state machine start to looking for training data words.

At time 11: this is the last correct control word before starting to see transitions.

At time 17: this is the first good and complete training data word pattern which detected by the vertical pattern recognition logic, at the same time the horizontal transition vector will be recorded. Those two critical information will be processed and generate the correct distance vector for each bit line.

After this point, the deskew logic is getting the "correct" alignment vector, but there is one more thing needed to be checked before really applied the deskew vector to the RX data path. The deskew logic will try the up to date "correct" alignment vector on a try run data path right after the detection of first good and complete training data word. The trying logic will deskew all data lines and then check to confirm with all line transition at the same time, if they are deskew correctly.

If the try-run logic confirms the correct transition happened, the "correct" alignment vector will be applied to RX data path next cycle and wait until the next training pattern detected successfully.

It is also possible to inject and manually correct skews through the registers. For the TX side, there are four registers to be used for skew insertion. Each bit line can be programmed through 3-bit register bit, for example:

In the third register, conf_tx_skew_3, bit 14 is the swapping enable bit and bit 123 is the inverting bit. When the swapping bit enabled, bit15 and bit0 will be swapped, bit14 and bit1 swapped and so on.

As an example:
Normal:
b15,b14,b13,b12,b11,b10,b9,b8,b7,b6,b5,b4,b3,b2,b1,b0
Swap enabled:
b1,b2,b3,b4,b5,b6,b7,b8,b9,b10,b11,b12,b13,b14,b15

When inverting is enabled, all bit lines will be inverted before sending to the analog block. Additionally, the control line is inverted.

For RX side, normally by default, the deskew circuit is always on and will correct any skew based on the training sequence. If the user would like to deskew manually, one can program the skew distance per bit line and then turn on the manual enable bit before it takes effect. The swap and invert bits are the same as TX side which is described as above. The freeze bit is used to disable the freeze option which stop the tracking circuit inside data recovery circuitry and frozen at a fixed point. This action will save some power consumption and also reduce noise from the analog block.

The SPI4 TX configuration register 5 is also modified as follows:

| 15 | 14 | 13 | 12 | 11 | 4 | 3 | 0 |
|---|---|---|---|---|---|---|---|
| tx_no dip2 | tx_add idle | digital loopbk | device loopbk | x | | test regs selection | |

It is noted that the digital and device loopback have been separated from the test registers as new bits in 13 and 12, respectively.

The above-discussed configuration of the invention is, in one embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and components, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method for selectively deskewing data traveling through a bus, comprising:
   receiving data from a plurality of data lines of said bus;
   detecting alignment information for the plurality of data lines to determine if there is a match with a training pattern;
   calculating a skew distance once there is said match; and
   bit aligning the plurality of data lines based on the skew distance.

2. The method according to claim 1, wherein said method is capable of deskewing data having a skew distance up to a 5-bit distance.

3. The method according to claim 1, wherein said step of receiving data comprises receiving bit-level data sent via a system packet interface level 4 interface.

4. The method according to claim 1, further comprising checking a manual skew register to determine if a manual deskew process should be performed.

5. The method according to claim 4, wherein, when the manual skew register indicates that the manual deskew process should be performed, the step of bit aligning the plurality of data lines occurs according to a manual skew distance entered by a user.

6. The method according to claim 1, further comprising checking a freeze current deskew pattern register to determine if a current deskew pattern should be maintained.

7. The method according to claim 6, wherein, when the freeze current deskew pattern register indicates that the current deskew pattern should be maintained, the step of calculating a skew distance comprises setting the skew distance based on the current skew pattern.

8. An apparatus for selectively deskewing data traveling through a bus, comprising:
   means for receiving data from a plurality of data lines of said bus;
   means for detecting alignment information for the plurality of data lines to determine if there is a match with a training pattern;
   means for calculating a skew distance once there is said match; and
   means for bit aligning the plurality of data lines based on the skew distance.

9. The apparatus according to claim 8, wherein said apparatus is configured to deskew data having a skew distance up to a 5-bit distance.

10. The apparatus according to claim 8, wherein said means for receiving data comprises means for receiving bit-level data sent via a system packet interface level 4 interface.

11. The apparatus according to claim 8, further comprising means for checking a manual skew register to determine if a manual deskew process is selected.

12. The apparatus according to claim 11, wherein, when the manual deskew process is selected, the means for bit aligning the plurality of data lines is configured to use the manual skew distance entered by a user.

13. The apparatus according to claim 8, further comprising means for checking a freeze current deskew pattern register to determine if a current deskew pattern should be maintained.

14. The apparatus according to claim 13, wherein, when the freeze current deskew pattern register indicates that the current deskew pattern should be maintained, the means for calculating a skew distance comprises means for setting the skew distance based on the current skew pattern.

15. An apparatus for selectively deskewing data traveling through a bus, comprising:
   a data port for receiving data from a plurality of data lines of said bus;
   an alignment detector for detecting alignment information for the plurality of data lines to determine if there is a match with a training pattern;
   a skew distance calculator for calculating a skew distance once there is said match; and
   a bit aligner for bit aligning the plurality of data lines based on the skew distance.

16. The apparatus according to claim 15, wherein said apparatus is configured to deskew data having a skew distance up to a 5-bit distance.

17. The apparatus according to claim 15, wherein said data port is configured to receive bit-level data sent via a system packet interface level 4 interface.

18. The apparatus according to claim 15, further comprising a manual skew register checker to check a manual skew register to determine if a manual deskew process is selected.

19. The apparatus according to claim 18, wherein, when the manual skew checker indicates that the manual deskew process is selected, the bit aligner is configured to use the manual skew distance entered by a user.

20. The apparatus according to claim 15, further comprising a current deskew pattern maintainer to determine if a current deskew pattern should be maintained.

21. The apparatus according to claim 20, wherein, when the current deskew pattern maintainer indicates that the current deskew pattern should be maintained, the skew distance calculator is configured to set the skew distance based on the current skew pattern.

* * * * *